United States Patent
Yamamura et al.

(10) Patent No.: US 8,181,538 B2
(45) Date of Patent: May 22, 2012

(54) MAGNESTOSTRICTIVE TORQUE SENSOR AND MANUFACTURING METHOD THEREOF, AND ELECTRIC POWER STEERING SYSTEM

(75) Inventors: Takuya Yamamura, Tochigi (JP); Yuichi Fukuda, Tochigi (JP); Nobuhiko Yoshimoto, Tochigi (JP); Yukiya Kashimura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/919,995

(22) PCT Filed: Feb. 26, 2009

(86) PCT No.: PCT/JP2009/053606
§ 371 (c)(1),
(2), (4) Date: Aug. 27, 2010

(87) PCT Pub. No.: WO2009/107751
PCT Pub. Date: Sep. 3, 2009

(65) Prior Publication Data
US 2011/0067947 A1    Mar. 24, 2011

(30) Foreign Application Priority Data

Feb. 28, 2008  (JP) .................................. 2008-048579

(51) Int. Cl.
*G01L 3/00* (2006.01)
*G01R 3/00* (2006.01)

(52) U.S. Cl. ......... 73/862.335; 73/862.333; 73/862.331; 73/862.325; 29/595

(58) Field of Classification Search .................. 73/862.331–862.336
See application file for complete search history.

(56) References Cited

U.S. PATENT DOCUMENTS

| | | | | |
|---|---|---|---|---|
| 4,823,617 A * | 4/1989 | Hase et al. | ............... | 73/862.335 |
| 5,442,966 A * | 8/1995 | Hase et al. | ............... | 73/862.335 |
| 7,497,132 B2 * | 3/2009 | Harata et al. | ............. | 73/862.335 |
| 7,677,115 B2 * | 3/2010 | Fukuda et al. | ........... | 73/862.335 |
| 2007/0074589 A1 * | 4/2007 | Harata et al. | ............. | 73/862.335 |
| 2007/0193372 A1 * | 8/2007 | Shimizu | ................... | 73/862.333 |
| 2007/0283767 A1 * | 12/2007 | Watanabe et al. | ........ | 73/862.331 |
| 2010/0263457 A1 * | 10/2010 | Yoneda et al. | ........... | 73/862.335 |

FOREIGN PATENT DOCUMENTS

| | | |
|---|---|---|
| JP | 6-41889 B2 | 6/1994 |
| JP | 2564049 B2 | 9/1996 |

(Continued)

*Primary Examiner* — Lisa Caputo
*Assistant Examiner* — Jonathan Dunlap
(74) *Attorney, Agent, or Firm* — Arent Fox LLP

(57) ABSTRACT

A magnestostrictive torque sensor detects rotating torque applied to a rod-shaped rotating shaft to work around the rotating shaft based on a change in magnetic characteristics of a magnetostrictive film formed on a surface the rotating shaft so as to extend around a full circumference thereof in a circumferential direction. The magnetostrictive film is formed continuously in an axial direction at a portion on the rotating shaft in the axial direction thereof. The magnetostrictive film has on the continuously formed area a first magnetostrictive film portion and a second magnetostrictive film portion having magnetic anisotropies which are opposite to each other and a third magnetostrictive film portion which is formed between the first and second magnetostrictive film portions. A first detection coil, a second detection coil and a third detection coil are provided for the first magnetostrictive film portion, the second magnetostrictive film portion and the third magnetostrictive film portion, respectively.

12 Claims, 12 Drawing Sheets

FOREIGN PATENT DOCUMENTS

| | | |
|---|---|---|
| JP | 2000-19032 A | 1/2000 |
| JP | 2002-82000 A | 3/2002 |
| JP | 2004-354327 A | 12/2004 |
| JP | 2006-64445 A | 3/2006 |
| JP | 2007-101422 A | 4/2007 |
| JP | 2007-225347 A | 9/2007 |

* cited by examiner (A) INTEGRAL MAGNETOSTRICTIVE FILM (B) SEPARATED MAGNETOSTRICTIVE FILMS

MAGNESTOSTRICTIVE TORQUE SENSOR AND MANUFACTURING METHOD THEREOF, AND ELECTRIC POWER STEERING SYSTEM

CROSS-REFERENCE TO RELATED APPLICATION

This application is a National Stage entry of International Application No. PCT/JP2009/053606, filed Feb. 26, 2009, which claims priority to Japanese Patent Application No. P.2008-048579 filed Feb. 28, 2008, the duty of disclosure of the prior application is incorporated in its entirety by reference.

TECHNICAL FIELD

The present invention relates a magnestostrictive torque sensor suitable for detecting steering torque of an electric power steering system or the like of a vehicle and a manufacturing method of the magnestostrictive torque sensor, and an electric power steering system which is configured by use of the magnestostrictive torque sensor.

BACKGROUND ART

In an electric power steering system which is generally equipped as a steering system of a motor vehicle, steering torque applied to a steering shaft from a steering wheel by a turning operation of the steering wheel by the driver is detected by a steering torque detecting portion. A magnestostrictive torque sensor is used as the steering torque detecting portion. The steering shaft is a rotating shaft which rotates by receiving rotating force generated by the driver who turns the steering wheel to steer the vehicle and functions in the steering torque detecting portion as its rotating shaft. In the electric steering system, a steering force assist motor is controlled to be driven in accordance with a torque signal detected by the steering torque detecting portion so as to mitigate a steering effort by the driver, giving a comfortable steering feeling to the driver.

A basic configuration of the magnestostrictive torque sensor which constitutes the torque detecting portion is shown in FIG. 11. Magnetostrictive films 102A, 102B are formed on a surface of a steering shaft (a rotating shaft) 101 of a vehicle. The magnetostrictive films 102A, 102B are provided to extend along a full circumference of the rotating shaft 101 in a circumferential direction at two locations along an axis of the rotating shaft 101 and have magnetic anisotropies 103, 104 which are opposite to each other. In the magnetostrictive film 102A, permeability changes to increase relative to clockwise torque. In the magnetostrictive film 102B, permeability changes to increase relative to counterclockwise torque. When input torque in a clockwise direction or a counterclockwise direction, which are shown by arrows 105, is applied to the steering shaft 101, the magnestostrictive torque sensor 100 detects changes in magnetic characteristics of the magnetostrictive films 102A, 102B which match torsion generated in the steering shaft 101 by detection coils 106A, 106B, respectively, in a non-contact fashion. The detection coil 106A is disposed so as to surround the magnetostrictive film 102A, and the detection coil 106B is disposes so as to surround the magnetostrictive film 102B.

FIG. 12 shows a detection principle of input torque based on the sensor configuration of the magnestostrictive torque sensor 100. A characteristic VT1 is an input torque output characteristic which is produced based on an output signal from the detection coil 106A, and a characteristic VT2 is an input torque output characteristic which is produced based on an output signal from the detection coil 106B. Since the magnetostrictive films 102A and 103A have the magnetic anisotropies 103, 104 which are directed in the opposite directions, inclinations of the characteristic VT1 and the characteristic VT2 are opposite to each other. A characteristic VT3 is an input torque output characteristic which is produced by taking a difference (VT1−VT2) between the characteristic VT1 and the characteristic VT2. Input torque applied to the steering shaft is obtained based on the characteristic VT3. Actually, a point B on the characteristic VT3 is set as an origin (an output value being 0), and an area lying on a right-hand side of the origin is referred to as a positive area, while an area lying on a left-hand side of the origin as a negative area. Information on rotating direction and magnitude of input torque applied to the steering shaft is obtained based on the characteristic VT3.

In a manufacturing method of the magnestostrictive torque sensor 100, magnetostrictive films 102A, 102B (broadly speaking, magnetostriction area portions) are formed so as to extend with an appropriate axial width along a full circumference of a surface of a rotatable rod-shaped (cylindrical) steering shaft 101 in a circumferential direction at two locations in an axial direction of the steering shaft 101, and magnetic anisotropies are provided to these magnetostrictive films 102A, 102B. A conventional method for providing magnetic anisotropies to magnetostrictive films adopts a method in which a magnetostrictive material plated portion (a magnetostrictive film) is formed through, for example, an electrolytic plating treatment so that torsional torque is applied to a shaft member (a rotating shaft). Then, stress is applied to a circumferential surface of the shaft member, and the shaft member is heated in a constant temperature bath in the stress applied condition (Patent Document 1).

Patent Document 1 proposes as a method for providing magnetic anisotropy a method in which a magnetostrictive film is plated to the surface of the steering shaft in the circumferential direction to a thickness of 40 μm, a torsional torque of 2 kgm is applied to the magnetostrictive film so as to apply stress thereto, and the steering shaft is subjected to a heating treatment at temperatures 150 to 550° C. for 10 minutes to approximately 20 hours.

In the conventional magnestostrictive torque sensor 100 shown in FIG. 11, there is a problem that failures of the magnetostriction films 102A, 102B cannot be detected accurately. The reason is that even in case a change is generated in a sensor output signal in relation to steering torque, it has not been able to determined whether the change results from a change in environment, the steering torque applied or failures of the magnetostrictive films 102A, 102B themselves.

In the configuration of the conventional magnestostrictive torque sensor 100 shown in FIG. 11, in order to enable the detection of failures of the magnetostrictive films 102A, 102B, as is shown in FIG. 13, two coils 106A-1, 106A-2, 106B-1, 106B-2 are provided for each of the two magnetostrictive films 102A, 102B (Patent Document 2). In FIG. 13, upper coils 106A-1, 106B-1 and lower coils 106A-2, 106B-2 are provided. As a result of this, by combining voltage signals which are outputted individually from the four detection coils based on predetermined relationships, a detection signal relating to steering torque and a failure detection signal can be obtained. According to the configuration, in case a failure occurs in either of the magnetostrictive films 102A, 102B, a failure of the magnetostrictive film can be detected by a failure detection signal.

Another magnetostrictive torque sensor having a failure detection construction is shown in FIG. 14 (Patent Document 3). In this magnestostrictive torque sensor 200, three magnetostrictive films 201A, 201B, 201C are formed in such a state that they are separated from each other in an axial direction of a rotating shaft 101. Two magnetostrictive films 201A, 201B which are positioned on an upper side and a lower side in FIG. 14 are magnetostrictive films to which different magnetic anisotropies are given. A failure detecting magnetostrictive film 201C is formed between the two magnetostrictive films 201A, 201B. Detection coils 202A, 202B, 202C are provided, respectively, on circumferences of the three magnetostrictive films 201A, 201B, 201C. A signal regarding steering torque is taken out based on two detection signals which are outputted from the two detection coils 202A, 202B. Further, a failure detection signal is taken out based on three detection signals which are outputted from the three detection coils 202A, 202B, 202C.

In the conventional magnestostrictive torque sensors, in the case of the configuration in which the steering torque detection and the magnetostrictive film failure detection can be executed at the same time, with the magnetostrictive films provided at the two locations, a total of four detection coils is required. The configuration has a problem that the number of components is increased, which increases, in turn, the manufacturing cost and manufacturing processes. In addition, in the event of the magnetostrictive films being formed at the three locations, a total number of detection coils becomes three. However, in an actual manufacturing process, the composition of iron constituent (Fe) of the magnetostrictive film which is positioned in the middle has to be lower than those of the other upper and lower magnetostrictive films, leading to a problem that the number of manufacturing processes is increased. Further, an axial dimension of the area on the steering shaft (the rotating shaft) where the magnetostrictive films are formed becomes long, leading to a problem that the magnetostrictive film area is enlarged.

Patent Document 1: JP-A-2002-82000
Patent Document 2: JP-A-2006-64445
Patent Document 3: JP-A-2007-101422

DISCLOSURE OF THE INVENTION

The invention provides a magnestostrictive torque sensor which enables a torque signal detection and a magnetostrictive film failure detection to be executed at the same time, which can reduce an area on a rotating shaft where magnetostrictive films are formed, which can reduce a total number of components such as detection coils and which can simplify its construction without increasing the number of manufacturing processes further, a method for manufacturing the magnestostrictive torque sensor and an electric power steering system which is configured by making use of the magnetostrictive torque sensor.

According to a first aspect of the invention, there is provided a magnestostrictive torque sensor comprising a rod-shaped rotating shaft, a magnetostrictive film which is formed on a surface of the rotating shaft so as to extend along a full circumference of the surface in a circumferential direction, and a first detection coil, a second detection coil and a third detection coil which are disposed along a circumference of the magnetostrictive film, wherein the magnetostrictive film is formed as an area which extends continuously in an axial direction of the rotating shaft and has on the continuously formed area a first magnetostrictive film portion and a second magnetostrictive film portion which have magnetic anisotropies which are opposite to each other and a third magnetostrictive film portion which is formed between the first magnetostrictive film portion and the second magnetostrictive film portion, and wherein the first detection coil, the second detection coil and the third detection coil are provided so as to correspond to the first magnetostrictive film portion, the second magnetostrictive film portion and the third magnetostrictive film portion, respectively.

In the magnetostrictive film that is formed at the portion of the magnestostrictive torque sensor where the rotating shaft resides, the two torque detecting magnetostrictive film portions and the failure detecting magnetostrictive film portion which is positioned therebetween are formed on the single continuous magnetostrictive film. The two torque detecting magnetostrictive films are formed by being heated so that the two magnetostrictive films have the opposite magnetic anisotropies. As a result, the magnetostrictive film portion which is formed in the midst is formed as a portion which does not change with torque. By forming on the single magnetostrictive film the upper and lower magnetostrictive film portions and the intermediate magnetostrictive film portion and providing the detection coils individually for the magnetostrictive film portions, the torque detection and the failure detection can be executed at the same time.

According to a second aspect of the invention, the third magnetostrictive film portion is preferably a non-torque sensitive area, and the third detection coil is preferably a failure detecting coil.

According to a third aspect of the invention, the magnetostrictive film is preferably formed at a portion in an axial direction of the rotating shaft on a circumferential surface of the rotating shaft so as to extend continuously in the axial direction.

According to a fourth aspect of the invention, axial lengths of the first magnetostrictive film portion, the second magnetostrictive film portion and the third magnetostrictive film portion are preferably almost the same as each other.

According to a fifth aspect of the invention, the rotating shaft is preferably at least part of a steering shaft of an electric power steering system of a vehicle.

According to a sixth aspect of the invention, an electric power steering system preferably comprises a steering shaft, a steering torque detecting portion for detecting steering torque applied to the steering shaft, and a control unit which controls to drive a motor in accordance with a steering torque detection signal which is outputted by the steering torque detecting portion so as to provide assisting torque to the steering shaft, wherein the steering torque detecting portion preferably includes any of the magnestostrictive torque sensors.

According to a seventh aspect of the invention, there is provided a magnestostrictive torque sensor manufacturing method comprising the steps of forming a magnetostrictive film on a surface of a rod-shaped rotating shaft along a full circumference of the surface in a circumferential direction at a portion in an axial direction of the rotating shaft so as to extend continuously in the axial direction, applying a heat treatment to a first magnetostrictive film portion of the magnetostrictive film with first torsional torque applied to the rotating shaft, producing first magnetic anisotropy in the first magnetostrictive film portion with the first torsional torque released, applying a heat treatment to a second magnetostrictive film portion with second torsional torque which acts in an opposite direction to the first torsional torque applied to the second magnetostrictive film portion, and producing second magnetic anisotropy in the second magnetostrictive film portion with the second torsional torque released, wherein a third magnetostrictive film portion having no magnetic anisotropy is formed between the first magnetostrictive film portion and the second magnetostrictive film portion.

According to an eighth aspect of the invention, in the magnestostrictive torque sensor manufacturing method, the first magnetostrictive film portion, the second magnetostrictive film portion and the third magnetostrictive film portion on the magnetostrictive film are formed continuously.

According to a ninth aspect of the invention, in the magnestostrictive torque sensor manufacturing method, the same heating coil is used in the heat treatment applied to the first magnetostrictive film portion and the heat treatment applied to the second magnetostrictive film portion, and wherein respective axial lengths of the first magnetostrictive film portion and the second magnetostrictive film portion are preferably almost the same.

The other features and advantages of the invention will be obvious from the description of an embodiment and appended claims.

Figure 1:
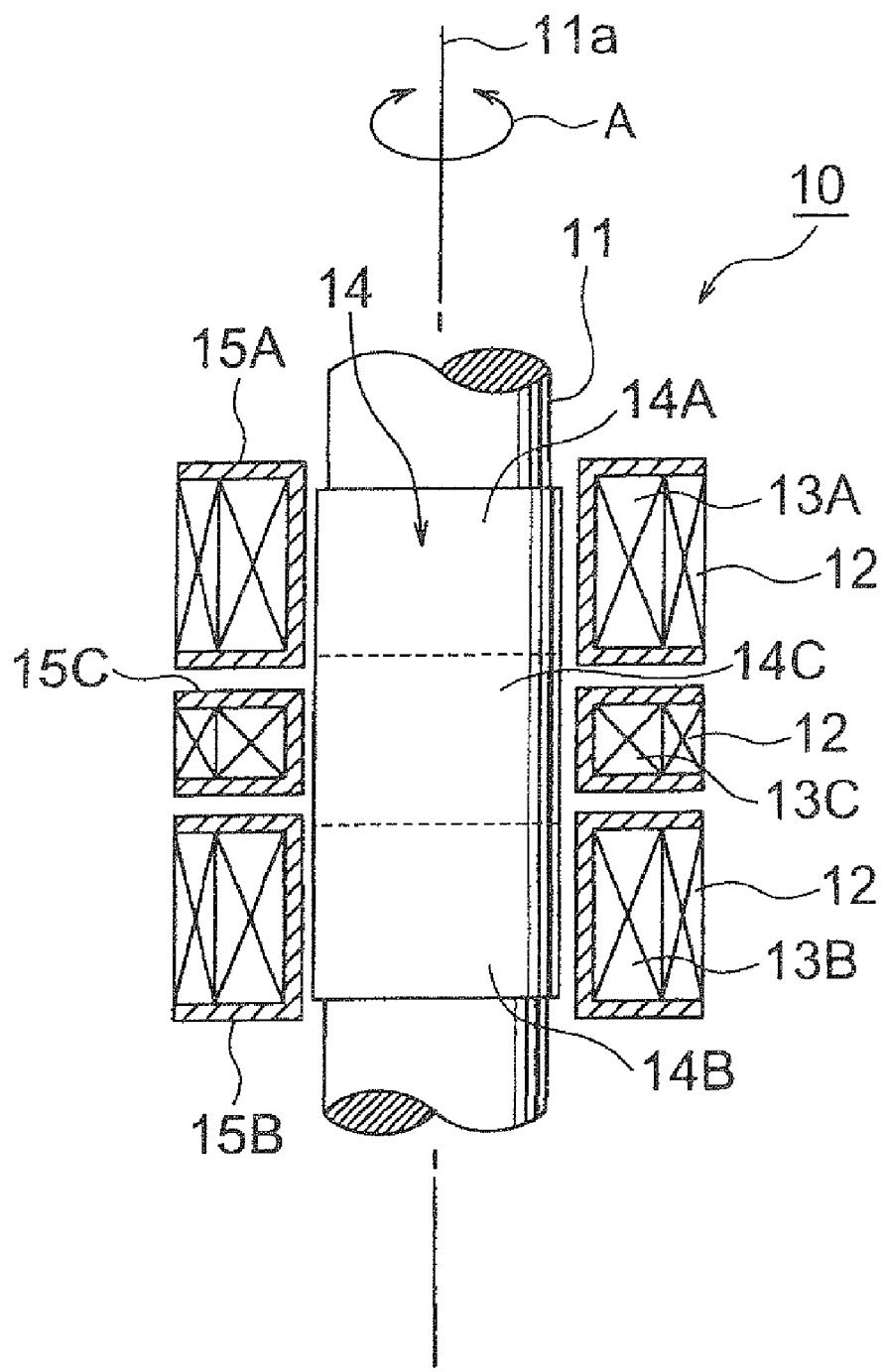
FIG. 1 A partially sectional side view showing conceptually a basic structure of a magnestostrictive torque sensor according to the invention.

DESCRIPTION OF REFERENCE NUMERALS AND CHARACTERS 10 magnestostrictive torque sensor;
11 rotating shaft;
12 exciting coil;
13A, 13B, 13C detection coil;
14 magnetostrictive film;
14A, 14B, 14C magnetostrictive film portion;
P1 magnetostrictive film forming process;
P2 magnetic anisotropy providing process;
P3 characteristic stabilizing step

BEST MODE FOR CARRYING OUT THE INVENTION

Hereinafter, a preferred mode (an embodiment) for carrying out the invention will be described based on the drawings.

Figure 2:
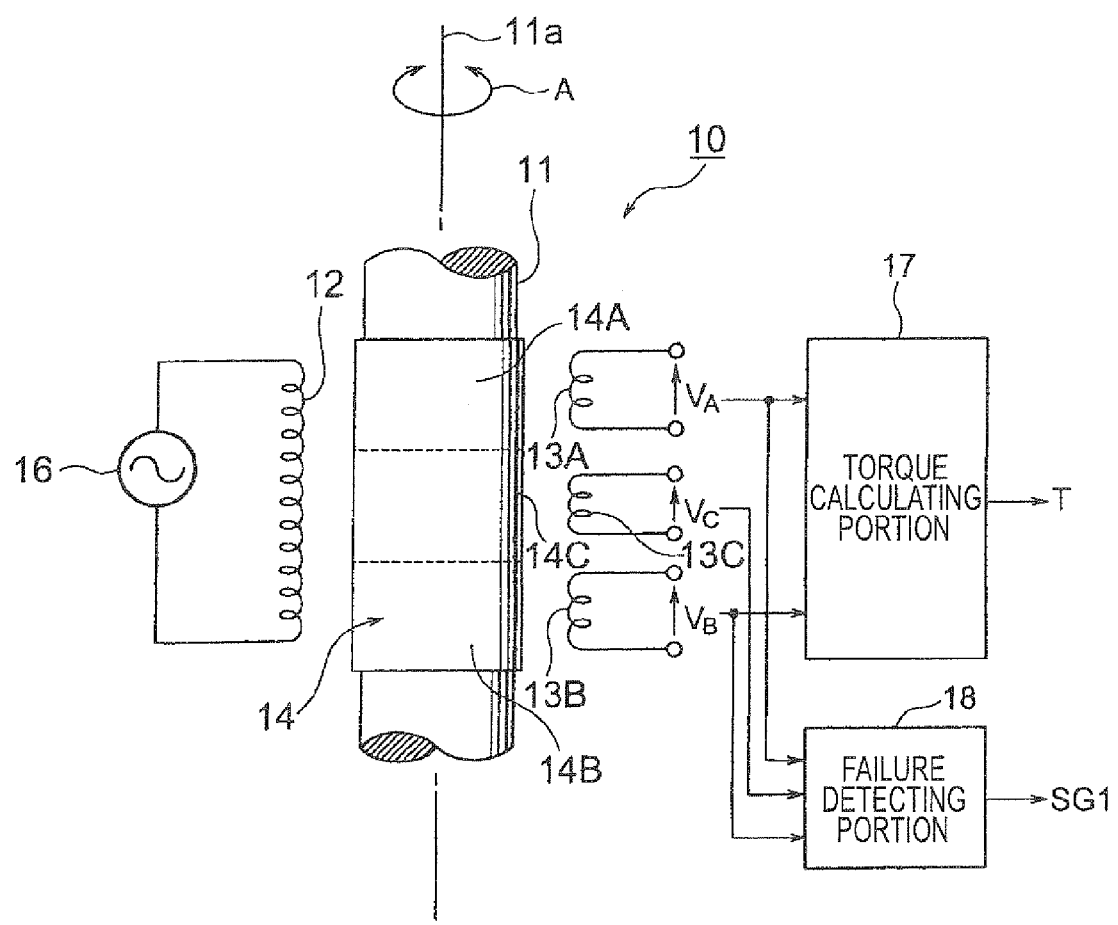
FIG. 2 A diagram showing a device configuration of the magnestostrictive torque sensor.
Figure 3:
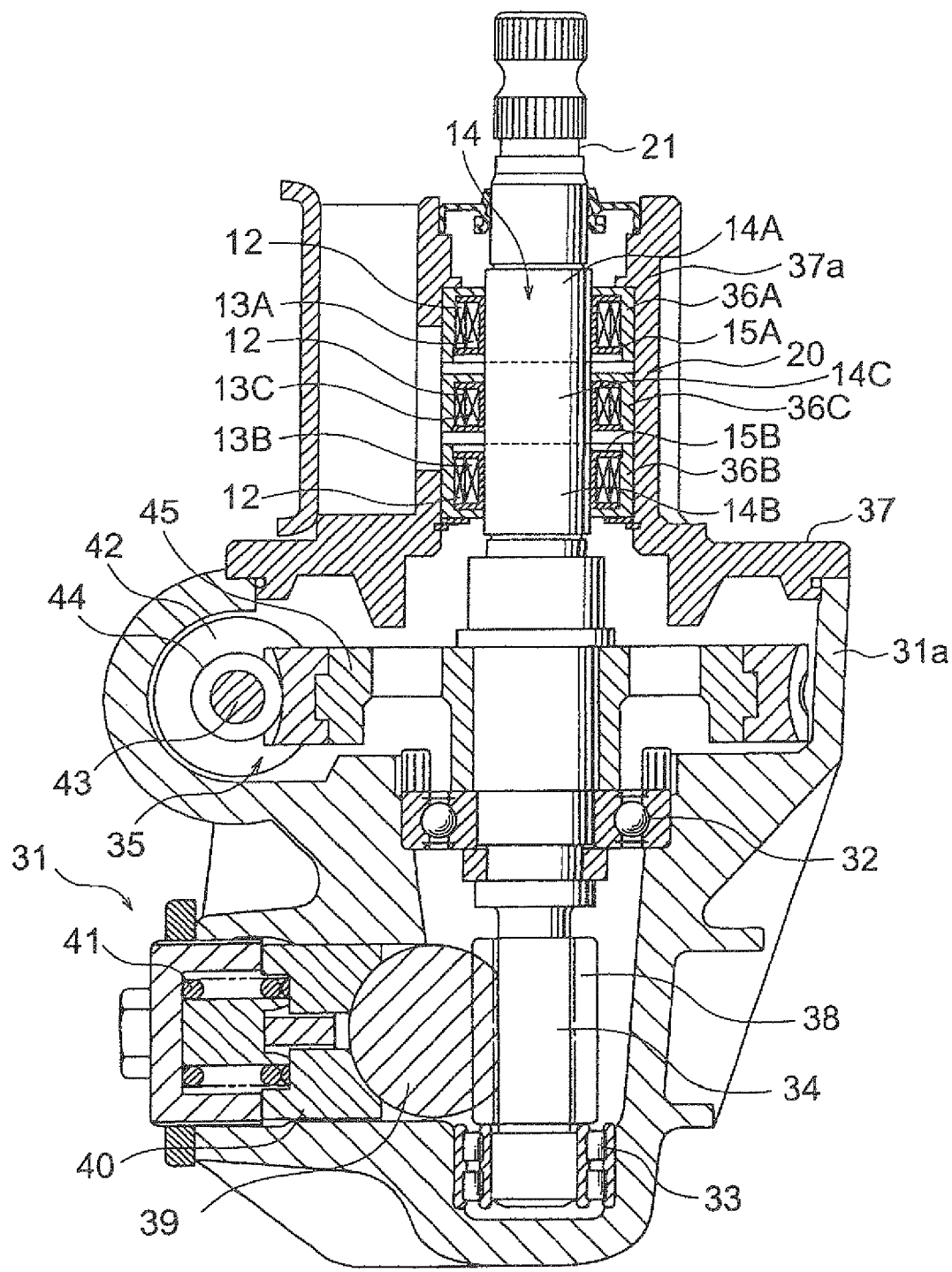
FIG. 3 A vertical sectional view showing an interior construction of an electric power steering system according to an embodiment of the invention.

Referring to FIGS. 1 to 3, a configuration of a magnestostrictive torque sensor will be described. FIGS. 1 to 3 show one structural example of a magnestostrictive torque sensor according to the invention. FIG. 1 is a partially sectional side view showing a basic structure of a magnetostrictive torque sensor, FIG. 2 is a side view which shows conceptually the basic structure of the magnetostrictive torque sensor, and FIG. 3 shows a vertical sectional view of a specific structure in which the magnestostrictive torque sensor is incorporated in a steering shaft of an electric power steering system as a steering torque detecting portion.

As shown in FIGS. 1 and 2, a magnestostrictive torque sensor 10 has a rotating shaft 11 having a rod (cylindrical) shape, an exciting coil 12 and three detection coils 13A, 13B, 13C. The exciting coil 12 and the detection coils 13A, 13B, 13C are disposed on a circumference of the rotating shaft 11. In FIGS. 1 and 2, the rotating shaft 11 is shown with its upper portion and lower portion cut to be omitted as a matter of convenience in explanation. When the magnestostrictive torque sensor 10 is used as a steering torque detecting portion of an electric power steering system of a vehicle, the rotating shaft 11 constitutes part of a steering shaft. This state is shown in FIG. 3.

The rotating shaft 11 receives rightward (clockwise) or leftward (counterclockwise) rotating force (torque) which acts around an axis 11a as indicated by an arrow A. The rotating shaft 11 is formed of a metallic rod made of a chrome-molybdenum steel material (SCM material), for example. A magnetostrictive film 14 is formed on the rotating shaft 11 as a single area which extends continuously in an axial direction. The magnetostrictive film 14 is formed to extend along a full circumference of the rotating shaft 11 in a circumferential direction. In FIG. 1 and the like, the thickness of the magnetostrictive film 14 is shown in an exaggerated fashion. The magnetostrictive film 14 which is formed at the single location is divided into three areas (portions). In FIG. 1 and the like, first and second magnetostrictive film portions 14A, 14B are formed respectively at upper and lower locations on the magnetostrictive film 14. Further, a third magnetostrictive film portion 14C is formed continuously between the two magnetostrictive film portions 14A, 14B. Each of the magnetostrictive film portions 14A, 14B, 14C is formed so as to extend along the full circumference of the rotating shaft 11 in the circumferential direction.

An axial widthwise dimension of each of the three magnetostrictive film portions 14A, 14B, 14C is preferably 8 mm. Because of this, an overall axial widthwise dimension of the magnetostrictive film 14 becomes 24 mm.

The magnetostrictive film 14 is preferably formed on the surface of the rotating shaft as a magnetostrictive material plated portion through an electrolytic plating treatment using a Ni—Fe alloy material. The magnetostrictive film portions 14A, 14B, which have oblique magnetic anisotropies, are formed by applying magnetic anisotropic treatments to the magnetostrictive material plated portion one for each area.

No magnetic anisotropy is provided to the magnetostrictive film portion 14C. Directions of the magnetic anisotropies of the magnetostrictive film portions 14A and 14B are opposite. The magnetostrictive film portion 14C has no oblique magnetic anisotropy and constitutes a non-torque sensitive portion. The method of manufacturing the magnetostrictive film 14 is not limited to the electrolytic plating, and hence, deposition and spattering can also be used.

As shown in FIG. 1, the exciting coil 12 and the detection coils 13A, 13B, 13C are provided so as to correspond to the first to third magnetostrictive film portions 14A, 14B, 14C, respectively.

The detection coil 13A is disposed around a circumference of the magnetostrictive film portion 14A with a gap interposed therebetween. The almost cylindrical and ring-shaped detection coil 13A surrounds the full circumference of the magnetostrictive film portion 14A. The detection coil 13B is disposed around a circumference of the magnetostrictive film portion 14B with a gap interposed therebetween. Similarly, the detection coil 13B surrounds the full circumference of the magnetostrictive film portion 14B. The ring-shaped exciting coil 12 is disposed on respective circumferences of the two detection coils 13A, 13B. In FIG. 1, although separate exciting coils 12 are provided individually to correspond to the magnetostrictive film portions 14A, 14B, in reality, two portions of the single exciting coil 12 are shown as being separated. The detection coils 13A, 13B and the exciting coil 12 are wound around circumferential spaces of the magnetostrictive film portions 14A, 14B by making use of ring-shaped supporting frame portions 15A, 15B. The supporting frame portions 15A, 15B are provided on the circumference of the rotating shaft 11 so as to surround the rotating shaft 11.

The detection coil 13C and the exciting coil 12 are provided around a circumference of the third magnetostrictive film portion 14C so as to surround the magnetostrictive film portion 14C with a gap interposed therebetween. The third magnetostrictive film portion 14C is a magnetostrictive film portion for detecting failures of the magnetostrictive film portions 14A, 14B which are provided for detecting input torque. The detection coil 13C and the exciting coil 12 are wound round a circumferential space of the magnetostrictive film portion 14C by making use of a ring-shaped supporting frame portion 15C. The supporting frame portion 15C is also provided along the circumference of the rotating shaft 11 so as to surround the rotating shaft 11.

In FIG. 2, the exciting coil 12 and the detection coils 13A, 13B, which are disposed to correspond to the magnetostrictive film portions 14A, 14B of the magnetostrictive film 14 formed on the rotating shaft 11, are shown conceptually as being in an electrical relationship. An alternating current power supply 16, which supplies an exciting alternating current at all times, is connected to the exciting coil 12 which is disposed commonly to the magnetostrictive film portions 14A, 14B. Induction voltages $V_A$, $V_B$ are outputted from respective output terminals of the detection coils 13A, 13B which are disposed to correspond to the magnetostrictive film portions 14A, 14B, respectively. The induction voltages $V_A$, $V_B$ correspond to torque which constitutes a target to be detected. Similarly, the exciting coil 12 and the detection coil 13C are disposed to correspond to the third magnetostrictive film portion 14C, and a voltage $V_C$ is outputted from an output terminal of the detection coil 13C.

The induction voltages $V_A$, $V_B$ which are outputted from the output terminals of the detection coils 13A, 13B are inputted into a torque calculating portion 17. The torque calculating portion 17 operates and calculates torque applied to the rotating shaft 11 based on the induction voltages $V_A$, $V_B$ and outputs a signal (T) regarding the torque. The torque calculating portion 17 is configured by an operation means such as a microcomputer or an operating electric circuit.

The induction voltages $V_A$, $V_B$, $V_C$ which are outputted from the respective output terminals of the detection coils 13A, 13B, 13C are inputted into a failure detecting portion 18. The failure detecting part 18 detects failures of the magnetostrictive film portions 14A, 14B based on the induction voltages $V_A$, $V_B$, $V_C$ and outputs a failure signal SG1. The failure detecting portion 18 is configured by an operation means such as a microcomputer or an operating electric circuit.

The relationship between the exciting coil 12 and the detection coils 13A, 13B, 13C coincides with the relationship between a first winding and a second winding of a transformer.

When torque resulting from rotating force is applied to the rotating shaft 11, changes in magnetic characteristics produced individually in the magnetostrictive film portions 14A, 14B are detected by making use of the detection coils 13A, 13B which are disposed around the circumferences of the magnetostrictive film portions 14A, 14B, respectively.

Referring to FIG. 3, a structure will be described in which the magnestostrictive torque sensor 10 is incorporated as a steering torque detecting portion on a steering shaft of an electric power steering system, for example. In FIG. 3, like reference numerals will be given to elements which are substantially like to the elements that are described in FIGS. 1 and 2.

FIG. 3 shows specific configurations of a steering torque detecting portion 20, a supporting construction of a steering shaft 21, a rack and pinion mechanism 34, a power transmission mechanism 35 and a steering effort assist motor 42.

In FIG. 3, an upper portion of the steering shaft 21 is connected to a steering wheel (not shown) of a vehicle. A lower portion of the steering shaft 21 is designed to transmit steering effort to an axle including a rack shaft via the rack and pinion mechanism 34. The steering torque detecting portion 20 is added to the upper portion of the steering shaft 21. The steering torque detecting portion 20 includes a magnestostrictive torque sensor 10. The upper portion of the steering shaft 21 on which a magnetostrictive film 14 (magnetostrictive film portions 14A to 14C) is formed corresponds to the steering shaft 11.

In a housing 31a which forms a gearbox 31, the steering shaft 21 is supported rotatably by two bearing portion 32, 33. The rack and pinion mechanism 34 and the power transmission mechanism 35 are accommodated in an interior of the housing 31a. The steering torque detecting portion 20 (including the magnestostrictive torque sensor 10) is added to the steering shaft 21 (corresponding to the rotating shaft 11) at an upper side of the housing 31a. The magnetostrictive film portions 14A, 14B, 14C are formed on the steering shaft 21, and an exciting coil 12 and detection coils 13A, 13B, 13C are provided so as to correspond to the magnetostrictive film portions 14A, 14B, 14C. The exciting coil 12 and the detection coils 13A, 13B, 13C are supported on supporting frame portions 15A, 15B, 15C and yoke portions 36A, 36B, 36C, respectively.

An upper opening of the housing 31a is closed by a lid 37. Although not shown, this lid 37 is fixed to the housing 31a with bolts. A pinion 38 is provided at a lower end portion of the steering shaft 21 and is positioned between the bearing portions 32, 33. The rack shaft 39 is guided by a rack guide 40 and is biased by a compressed spring 41 so as to be pressed against to the pinion 38 side. The power transmission mechanism 35 is formed by a worm gear 44 and worm wheel 45. The worm gear 44 is fixed to a transmission shaft 43 which is joined to an output shaft of the steering effort assist motor 42. The worm wheel 45 is fixed to the steering shaft 21. The steering torque detecting portion 20 is mounted in an interior of a cylindrical portion 37a of the lid 37.

The steering torque detecting portion 20 detects steering torque that is applied to the steering shaft 21. The detected value is inputted into a control unit (not shown in FIG. 3) and is used as a reference signal to generate assisting steering torque suitable for the motor 42.

When steering torque is applied to the steering shaft 21 from the steering wheel, the steering torque detecting portion 20 detects electrically changes in magnetic characteristics of the magnetostrictive film portions 14A, 14B which correspond to torsion generated in the steering shaft 21 and a change in the characteristics of the magnetostrictive film portion 14C as changes in the induction voltages $V_A, V_B, V_C$ from the respective output terminals of the detection coils 13A, 13B, 13C.

Figure 4:
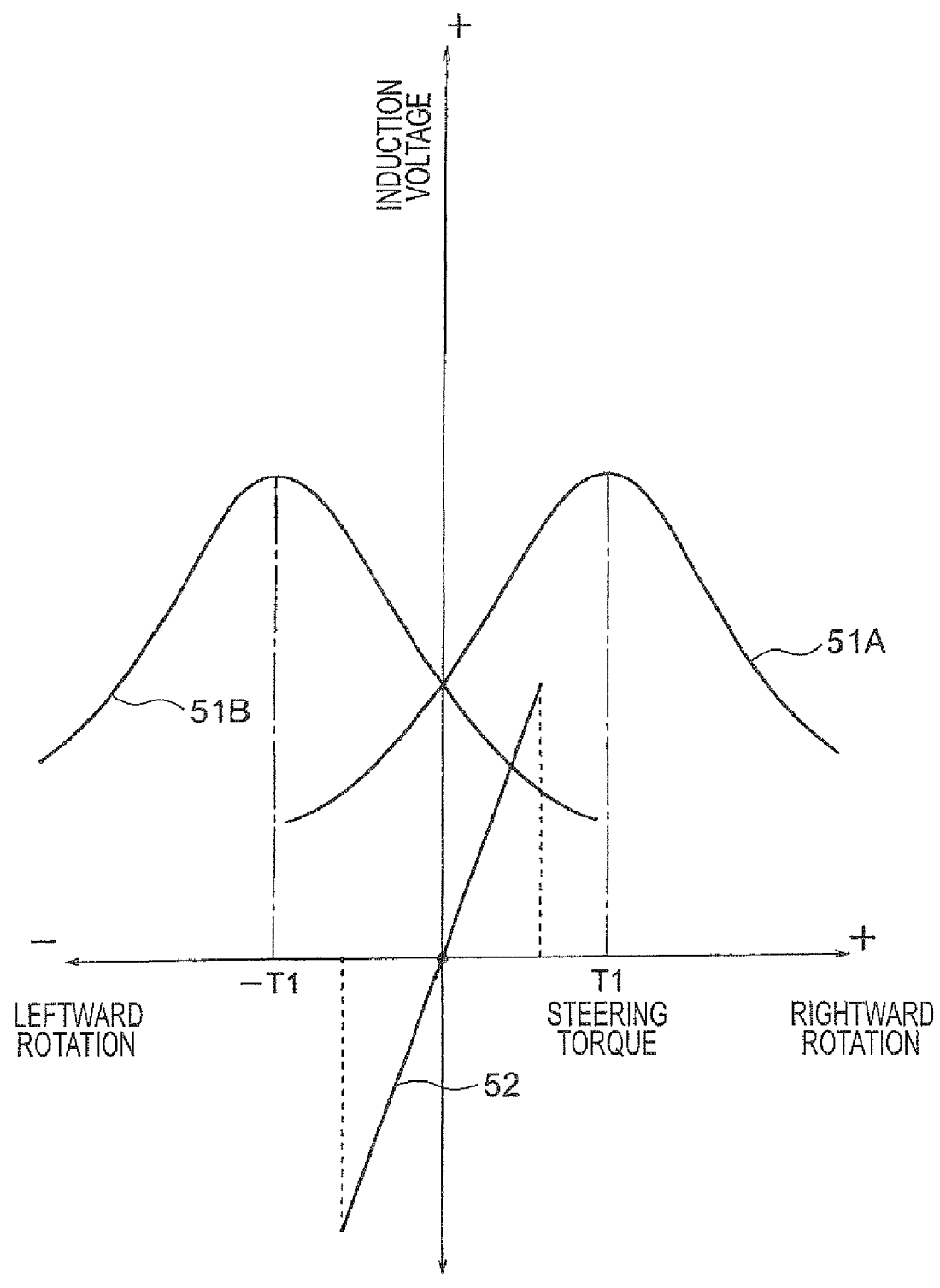
FIG. 4 A graph showing magnetostriction characteristic curves and a sensor detection characteristic of a torque detecting portion of the magnestostrictive torque sensor.

Convex magnetostriction characteristic curves 51A, 51B shown in FIG. 4 are obtained for the two detection coils 13A, 13B, respectively. These magnetostriction characteristic curves 51A, 51B correspond to characteristic changes of the induction voltages which are detection outputs from the detection coils 13A, 13B.

The steering torque detecting portion 20 calculates a difference between the induction voltages outputted from the two detection coils based on the two magnetostriction characteristic curves 51A, 51B and detects a rotating direction (rightward rotation or leftward rotation) and magnitude of the steering torque applied to the steering shaft 21 by a sign and magnitude of the calculated value.

When the steering torque is applied to the steering shaft 21, torsion is generated in the steering shaft 21, as a result of which magnetostriction effects are generated in the magnetostrictive film portions 14A, 14B. Since an exciting current is supplied to the exciting coil 12 from the alternating current power supply 16 at all times in the steering torque detecting portion 20, changes in magnetic field by changes in permeability attributed to the magnetostriction effects in the magnetostrictive film portions 14A, 14B are detected by the detection coils 13A, 13B as changes in induction voltages $V_A, V_B$. According to the steering torque detecting portion 20, a difference between the two induction voltages $V_A, V_B$ is outputted as a detected voltage value based on the changes in the induction voltages $V_A, V_B$. Consequently, a direction and magnitude of steering torque (T) that is applied to the steering shaft 21 can be detected based on the output voltage value ($V_A-V_B$) from the steering torque detecting portion 20.

FIG. 4 shows the respective magnetostriction characteristic curves 51A, 51B of the magnetostrictive film portions 14A, 14B. In FIG. 4, a horizontal axis represents steering torque applied to the steering shaft 21. A positive side (+) corresponds to rightward rotation, and a negative side (−) corresponds to leftward rotation. A vertical axis in FIG. 4 represents an axis of voltage.

The magnetostriction characteristic curves 51A, 51B of the magnetostrictive film portions 14A, 14B represent detection output characteristics of the detection coils 13A, 13B at the same time. Namely, since the exciting alternating current is supplied to the magnetostrictive film portions 14A, 14B which have the magnetostriction characteristic curves 51A, 51B, respectively, by the common exciting coil 12 and the detection coils 13A, 13B output induction voltages in response to the exciting alternating current, the changes in characteristics of the induction voltages of the detection coils 13A, 13B correspond to the magnetostriction characteristic curves 51A, 51B of the magnetostrictive film portions 14A, 14B. In other words, the magnetostriction characteristic curve 51A represents the change in characteristics of the induction voltage $V_A$ outputted from the detection coil 13A. On the other hand, the magnetostriction characteristic curve 51B represents the change in characteristics of the induction voltage $V_B$ outputted from the detection coil 13B.

According to the magnetostriction characteristic curve 51A, the value of the induction voltage $V_A$ outputted from the detection coil 13A has a characteristic that the value of steering torque changes from the negative area to the positive area and increases further in a substantially linear characteristic as the steering torque value reaches a positive value T1, takes a peak value when the steering torque reaches the positive value T1 and decreases gradually when the steering torque increases further than T1. On the other hand, according to the magnetostriction characteristic curve 51B, the value of the induction voltage $V_B$ outputted from the detection coil 13B has a characteristic that the value of steering torque increases gradually until it reaches a negative value −T1, takes a peak value when the steering torque value reaches the negative value −T1 and decreases in a substantially linear characteristic when the steering torque increases further than −T1 and changes from the negative area to the positive area.

As shown in FIG. 4, the magnetostriction characteristic curve 51A relating to the detection coil 13A and the magnetostriction characteristic curve 51B relating to the detection coil 13B are in a substantially axisymmetric relationship with respect to a vertical axis which includes a point where both the magnetostriction characteristic curves intersect by reflecting the fact that the magnetostrictive film portions 14A, 14B have the magnetic anisotropies whose directions are opposite.

A line 52 shown in FIG. 4 shows, in a common area of the magnetostriction characteristic curves 51A, 51B which is an area having the substantially linear characteristic, a graph prepared based on values resulting when respective values on the magnetostriction characteristic curve 51B which is obtained as the output voltage of the detection coil 13B are deducted from corresponding respective values on the magnetostriction characteristic curve 51A which is obtained as the output voltage of the detection coil 13A. Since induction voltages outputted from the respective detection coils 13A, 13B are equal when the steering torque is zero, a value of a difference therebetween becomes zero. In the steering torque detecting portion 20, the line 52 is formed as having a substantially rectilinear characteristic by using an area regarded as having a substantially constant gradient which lies near a neutral point (a zero point) of the steering torque on the magnetostriction characteristic curves 51A, 51B. As to the characteristic graph of the line 52, a vertical axis in FIG. 4 represents an axis showing values of differential voltage. The line 52, which is the characteristic graph, is a straight line which passes through an origin (0, 0) and exists in a positive side and a negative side of the vertical axis and the horizontal axis. Since the detection output value of the steering torque detecting portion 20 is obtained as the difference ($V_A-V_B$) between the induction voltages which are outputted from the detection coils 13A, 13B, as has been described above, the direction and magnitude of the steering torque applied to the steering shaft 21 can be obtained by making use of the straight line 52.

As described above, the detection signal corresponding to the rotating direction and magnitude of the steering torque inputted into the steering shaft 21 (the rotating shaft 11) can be taken out based on the output value of the steering torque detecting portion 20. Namely, the rotating direction and magnitude of the steering torque applied to the steering shaft 21 can be known by the detection value outputted from the steering torque detecting portion 20.

In other words, a detection value of the steering torque detecting portion 20 is outputted as any point on the straight line 52 in accordance with steering toque applied. When the detection value is positioned on the positive side on the horizontal axis, it is determined that the steering torque is rightward rotation, while when the detection value is positioned on the negative side on the horizontal axis, it is determined that the steering torque is leftward rotation. The absolute value of the detection value on the vertical axis denotes the magnitude of steering torque. In this way, steering torque can be detected by the steering torque detecting portion 20 based on the output voltage values of the detection coils 13A, 13B by making use of the characteristics of the straight line 2.

In addition, a failure determination is executed as follows at the failure detecting portion 18 into which the induction voltages $V_A$, $V_B$, $V_C$ of the detection coils 13A, 13B, 13C are inputted.

Figure 5:
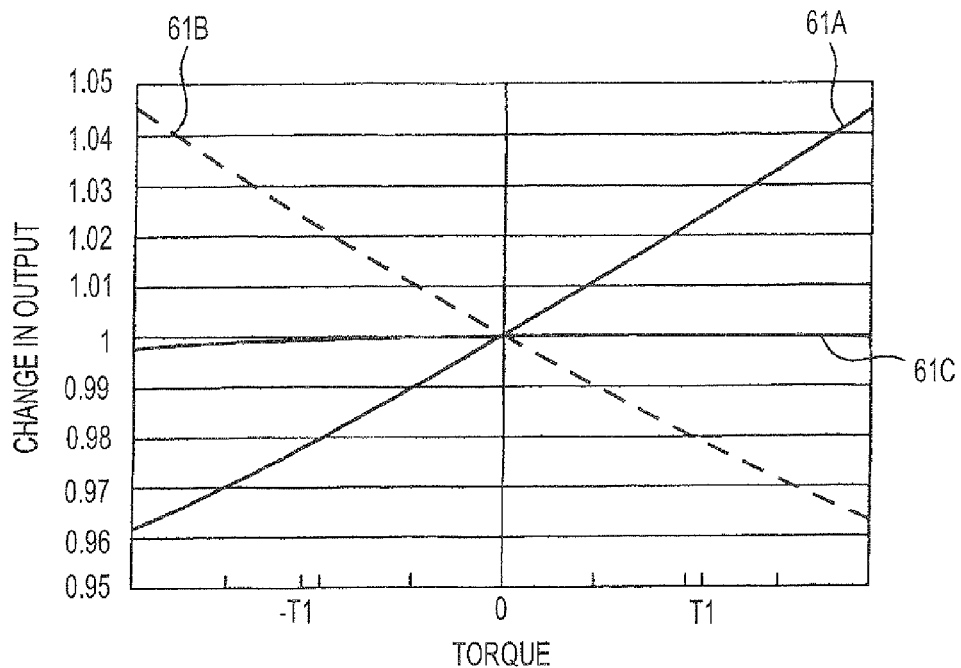
FIG. 5 A graph showing output change characteristics of torque detection coils and a failure detection coil of the magnestostrictive torque sensor.

FIG. 5 shows respective torque/output characteristics of the three detection coils 13A, 13B, 13C. Reference numeral 61A denotes a torque/output characteristic of the detection coil 13A, reference numeral 61B denotes a torque/output characteristic of the detection coil 13B, and reference numeral 61C denotes a torque/output characteristic of the detection coil 13C. A steering torque signal $V_{OUT}$ is taken out by the output characteristic 61A of the detection coil 13A and the output characteristic 61B of the detection coil 13B. Failure detection signals $V_{OUT}1$, $V_{OUT}2$ are taken out by the output characteristic 61A of the detection coil 13A and the output characteristic 61C of the detection coil 13C and by the output characteristic 61B of the detection coil 13B and the output characteristic 61C of the detection coil 13C.

In a failure detection by the failure detecting portion 18, when $V_{OUT}$ changes, $V_{OUT}1$ is constant and $V_{OUT}2$ changes, it is determined that the magnetostrictive film portion 14A fails. Further, when $V_{OUT}$ changes, $V_{OUT}1$ changes and $V_{OUT}2$ is constant, it is determined that the magnetostrictive film portion 14B fails. More over, when $V_{OUT}$ is constant, $V_{OUT}1$ and $V_{OUT}2$ change, it is determined that the magnetostrictive film portion 14C fails.

When steering toque is inputted into the rotating shaft 11, output signals from the detection coils 13A, 13B, which correspond to the magnetostrictive film portions 14A, 14B having the magnetic anisotropies, change with respect to the steering torque. However, an output signal from the detection coil 13C, which corresponds to the magnetostrictive film portion 14C having no magnetic anisotropy, changes little with steering torque. On the other hand, when disturbance (for example, a change in temperature) other than torque is inputted into the rotating shaft 11, similar changes occur in the respective output signals of the detection coils 13A to 13C. Consequently, by making use of the output signal from the detection coil 13C, drift due to disturbance contained in the output signals from the detection coils 13A, 13B can be compensated for. In addition, the magnetostrictive film 14 where the magnetostrictive film portions 14A to 14C are formed has the same Fe constituent and has no difference in composition, an error can be made small at the time of compensation.

Figure 6:
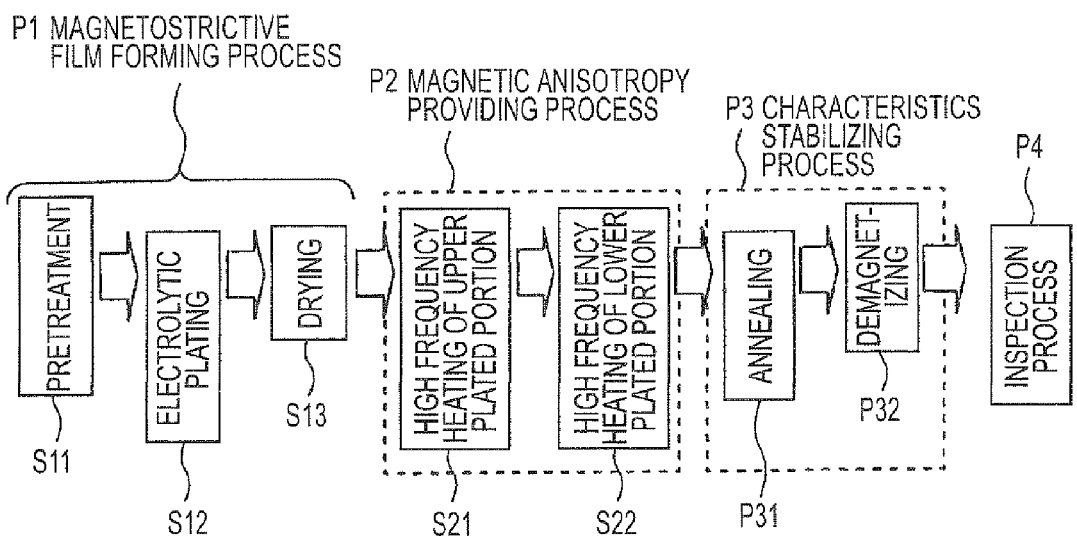
FIG. 6 A process drawing showing a rotating shaft manufacturing process in a magnestostrictive torque sensor manufacturing method.
Figure 7:
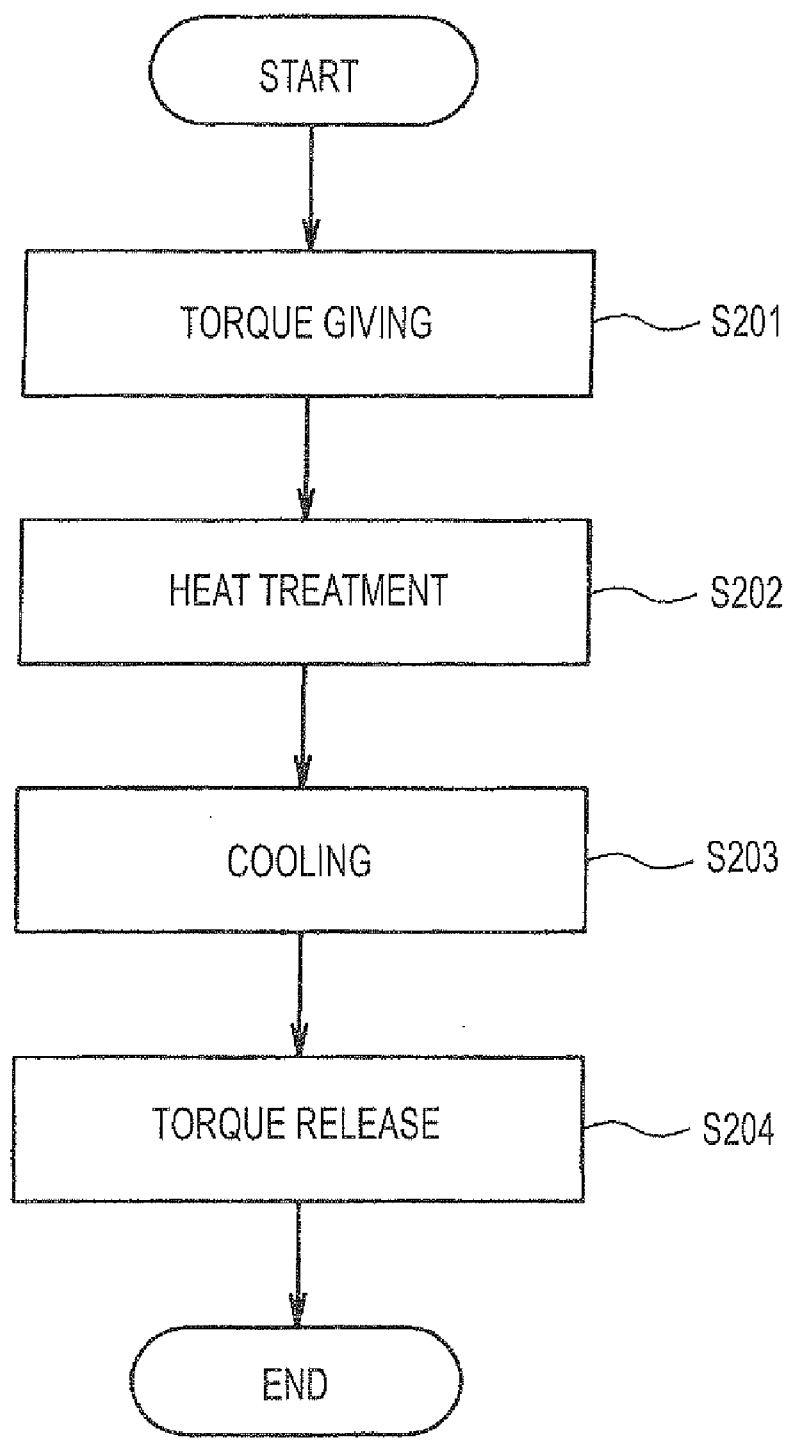
FIG. 7 A flowchart showing a magnetic anisotropy providing process.

Referring to FIGS. 6 and 7, a manufacturing method of the magnetostrictive torque sensor 10 will be described. A main part of the manufacturing method of the magnetostrictive torque sensor 10 shown in FIG. 6 is a manufacturing process of the rotating shaft 11 of the magnestostrictive torque sensor 10.

In FIG. 6, the manufacturing process of the rotating shaft 11 is roughly made up of a magnetostrictive film forming process P1, a magnetic anisotropy providing process P2, a characteristic stabilizing process P3 and an inspection process P4. The characteristic stabilizing process P3 is made up, in turn, of an annealing process P31 and a demagnetizing process P32. The inspection process P4 is a process of inspecting a quality of a rotating shaft fabricated. In order to complete a magnestostrictive torque sensor 10, a detectors installing process is provided of installing the exciting coil 12 and the detection coils 13A to 13C on the rotating shaft 11 after the inspection process P4.

Firstly, the magnetostrictive film forming process P1 is executed. In the magnetostrictive film forming process P1, a magnetostrictive material plated portion is formed as a portion which constitutes a base for the magnetostrictive film 14 at a predetermined location on a surface of the rotating shaft 11 through an electrolytic plating treatment.

Normally, a receiving inspection process, not shown, is provided before the magnetostrictive film forming process P1.

In the magnetostrictive film forming process P1, firstly, a pretreatment is executed on the rotating shaft 11 (step S11). In the pretreatment process, for example, steps are executed which include, for example, preliminary washing, masking jig attachment, electrolytic degreasing, acid electrolysis. Thereafter, electrolytic plating is executed (step S12). In this electrolytic plating step, a magnetostrictive material is applied continuously at on location on the rotating shaft 11 to a predetermined thickness. The magnetostrictive material plated portion is a portion which becomes a magnetostrictive film 14 having a magnetic anisotropy through a post-treatment, which will be described later. Thereafter, after a "jig removal," not shown, is executed, a drying step is executed (step S13).

In the magnetostrictive film forming process P1, an electrolytic plating treatment method is used to form the magnetostrictive film 14 on the surface of the rotating shaft 11. However, the basic portion on the rotating shaft 11 where a magnetostrictive film 14 is to be formed can also be formed by other methods than the electrolytic plating method which include, for example, a spattering method, a PVD method such as an ion plating method, and a plasma spray coating method.

Figure 8:
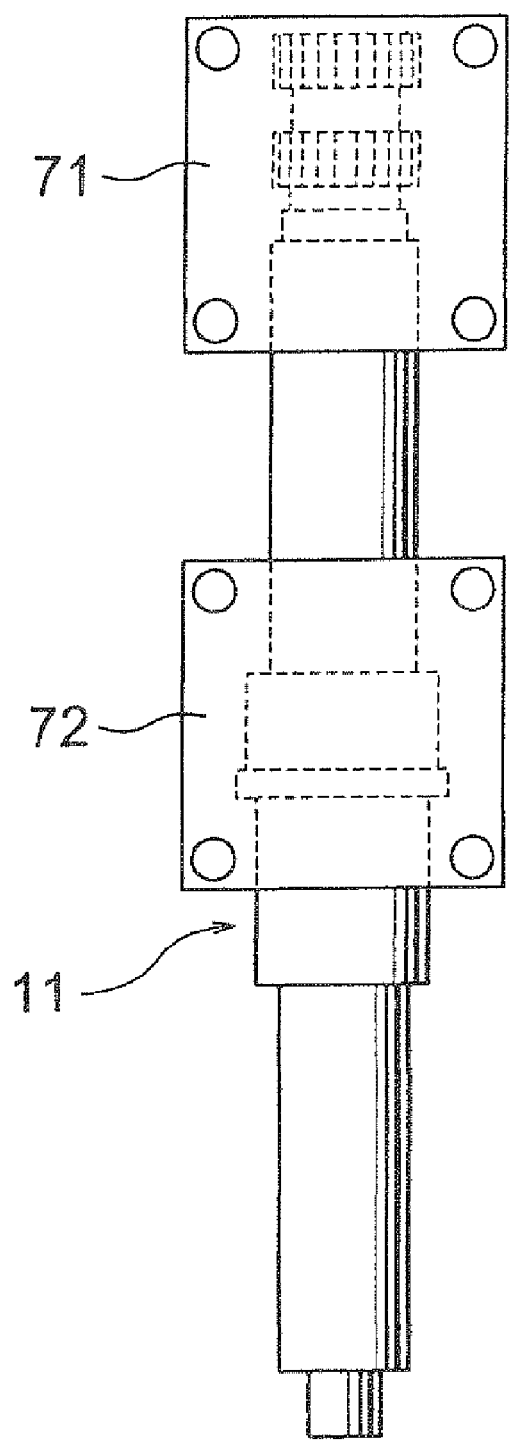
FIG. 8 A side view showing a masking state in plating a magnetostrictive film area on a rotating shaft.

In the magnetostrictive film forming process P1, although masking is applied to the single continuous area on the rotating shaft 11 to form a plated portion which is to constitute a magnetostrictive film 14, compared with the conventional method in which the magnetostrictive films are formed at the plurality of locations, as shown in FIG. 8, by using two masking members 71, 72, masking can be implemented simply, thereby making it possible to reduce the production costs.

Next, the magnetic anisotropy providing process P2 is executed. This magnetic anisotropy providing process P2 is a process in which a magnetic anisotropy is provided to part of the magnetostrictive material plated portion which is formed at the one location on the rotating shaft 11, so as to form the magnetostrictive film portions 14A, 14B and the magnetostrictive film portion 14C. The magnetic anisotropy providing process P2 has a step S21 in which high frequency heating is applied to a magnetostrictive material plated portion in an upper area and a step S22 in which high frequency heating is applied to a magnetostrictive material plated portion in a lower area.

FIG. 7 is a flowchart showing processing steps which are executed in the respective steps S21, S22 of the magnetic anisotropy providing process P2.

The step S21 in which high frequency heating is applied to the magnetostrictive material plated portion in the upper area has a torque applying step S201, a heat treatment step S202, a cooling step S203 and a torque releasing step S204. In the torque applying step S201 which is executed first, a predetermined torsional torque (Tq) is applied to the rotating shaft 11 by a torque applicator (not shown). Next, in the heat treatment step S202, high frequency is supplied to the magnetostrictive material plated portion in the upper area of the rotating shaft 11 to which the predetermined torsional torque (Tq) is applied for a predetermined length of time only for execution of a heating treatment by electromagnetic induction. Next, in the cooling step S203, the heated rotating shaft 11 is cooled naturally. Finally, in the torque releasing step S204, a magnetic anisotropy is provided to the magnetostrictive material plated portion in the upper area by releasing the torsional torque, whereby the magnetostrictive film portion 14A is formed.

In the heat treatment step S202, an induction heating coil is disposed at the magnetostrictive material plated portion in the upper area of the rotating shaft 11 to which the torque is being applied, and a predetermined high frequency is supplied to this induction heating coil from the high frequency power supply so as to high frequency heat only the magnetostrictive material plated portion in the upper area.

The magnetic anisotropy is provided to the magnetostrictive material plated portion in the upper area on the rotating shaft 11, whereby the magnetostrictive film portion 14A is formed in the magnetostrictive film 14 which has the magnetic anisotropy.

In the high frequency heating step S22 for the magnetostrictive material plated portion in the lower area of the magnetostrictive film 14 on the rotating shaft 11, the steps S202 to S204 are executed similarly. Namely, a magnetic anisotropy is provided to the magnetostrictive material plated portion in the lower area, whereby the magnetostrictive film portion 14B which has the magnetic anisotropy is formed in the magnetostrictive film 14 which has the magnetic anisotropy. In this case, when the magnetostrictive film portion 14B is formed by providing the magnetic anisotropy to the magnetostrictive material plated portion in the lower area, the direction in which torque is applied to the rotating shaft is reversed so that the magnetic anisotropy becomes opposite to the magnetic anisotropy of the magnetostrictive film portion 14A.

Figure 9:
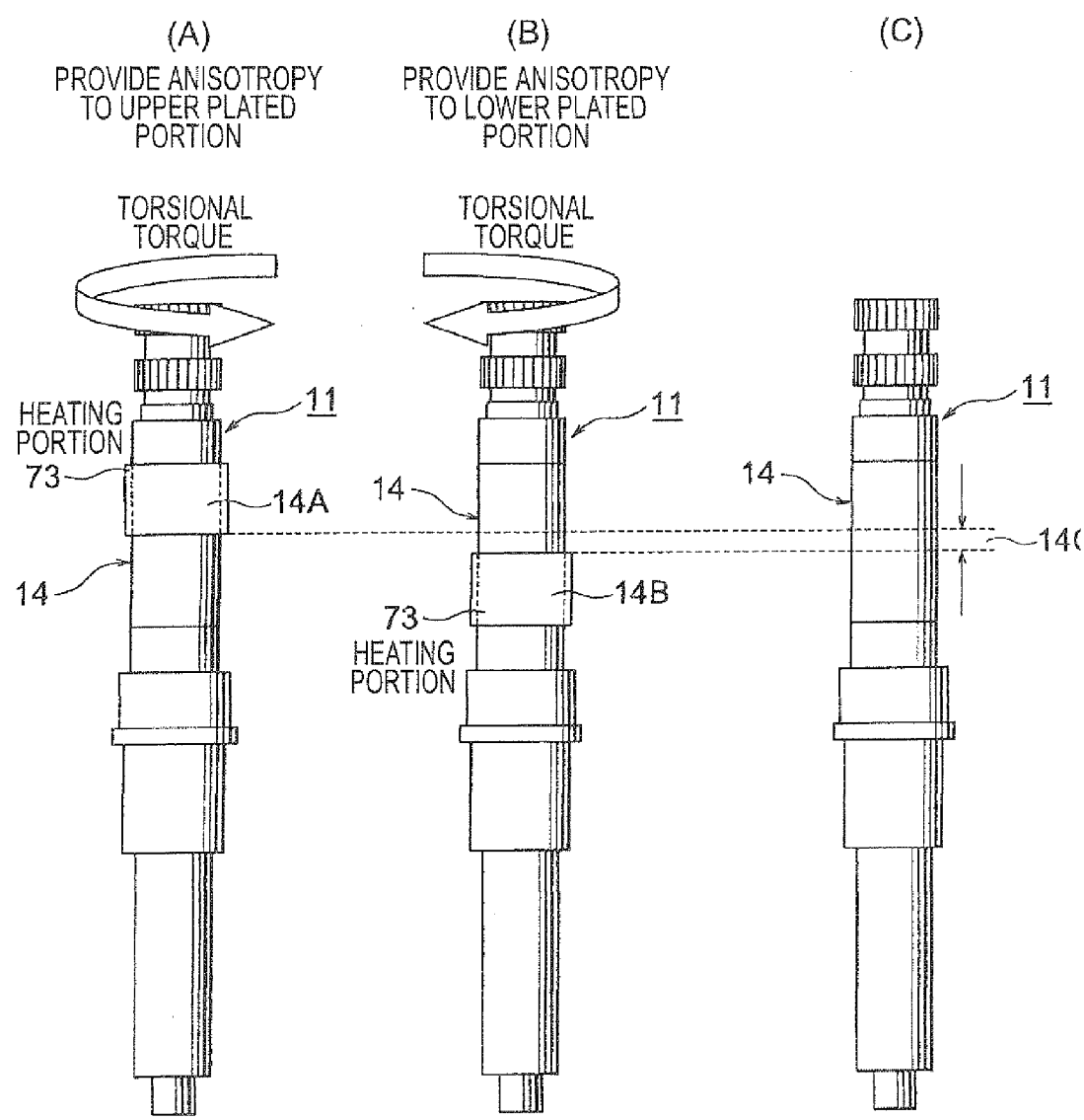
FIGS. 9(A) to 9(C) are diagrams explaining a heat treatment when providing magnetic anisotropies to two locations on the magnetostrictive film of rotating shaft.

FIGS. 9(A) to 9(C) show a state in which the magnetostrictive film portion 14A and the magnetostrictive film portion 14B are formed on the magnetostrictive film 14. FIG. 9(A) shows a state in which the magnetostrictive film portion 14A is formed, and FIG. 9(B) shows a state in which the magnetostrictive film portion 14B is formed. In FIGS. 9(A) and 9(B), an area 73 denotes a heated portion. In the magnetostrictive film 14, to form the magnetostrictive film portion 14A and the magnetostrictive film portion 14B, the heating treatments are applied to the respective areas, and as a result of the heat treatments so applied, the magnetostrictive film portion 14C is formed in an intermediate area as a non-torque sensitive area which has no oblique anisotropy as shown in FIG. 9(C). The intermediate portion (corresponding to the magnetostrictive film portion 14C) of the magnetostrictive film 14 is heated eventually through heat dispersion when the magnetostrictive film portion 14A and the magnetostrictive film portion 14B are heat treated. On the other hand, the applied torque at the intermediate portion is reversed every time each of the magnetostrictive film portion 14A and the magnetostrictive film portion 14B is heat treated. As a result of this, the magnetostrictive film portion 14C has no oblique magnetic anisotropy and is made into a non-torque sensitive area. The forming process of the magnetostrictive film portion 14A and the magnetostrictive film portion 14B is the same as the conventional one. According to the magnestostrictive torque sensor manufacturing method of the embodiment, although the forming process is the same as the conventional one, the magnetostrictive film 14 can be formed which includes the magnetostrictive film portions 14A, 14B which have the opposite magnetic anisotropies and the magnetostrictive film portion 14C.

The magnetostrictive film portions 14A, 14B, which reside in the upper and lower areas, and the magnetostrictive film portion 14C, which resides in the intermediate area, are formed continuously on the magnetostrictive film 14 as the area which is formed continuously at the one location on the rotating shaft 11. Because of this, an axial dimension of the magnetostrictive film 14 can be made much shorter than one resulting when the magnetostrictive film portions 14A to 14C are formed separately.

Figure 10:
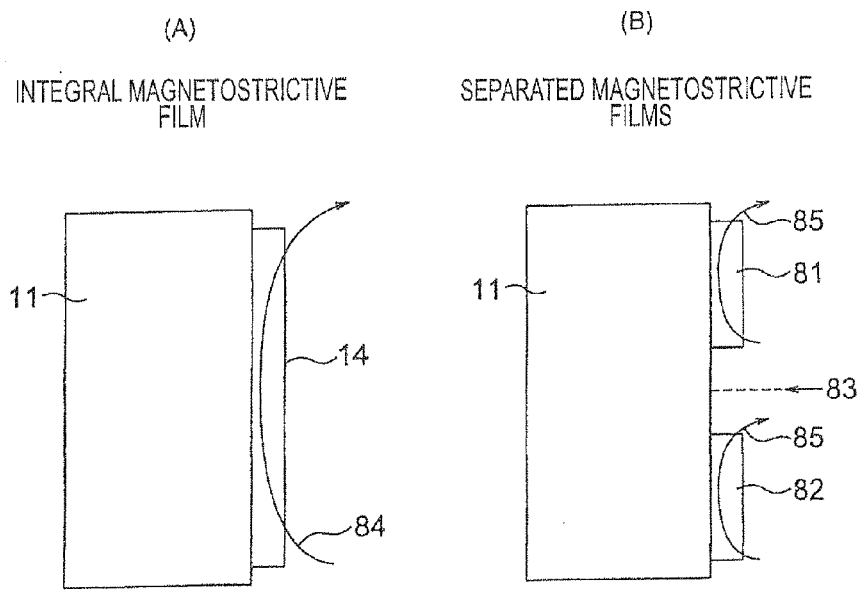
FIGS. 10(A) and 10(B) are diagrams explaining advantages of the magnetostrictive film of the magnestostrictive torque sensor according the embodiment.
Figure 11:
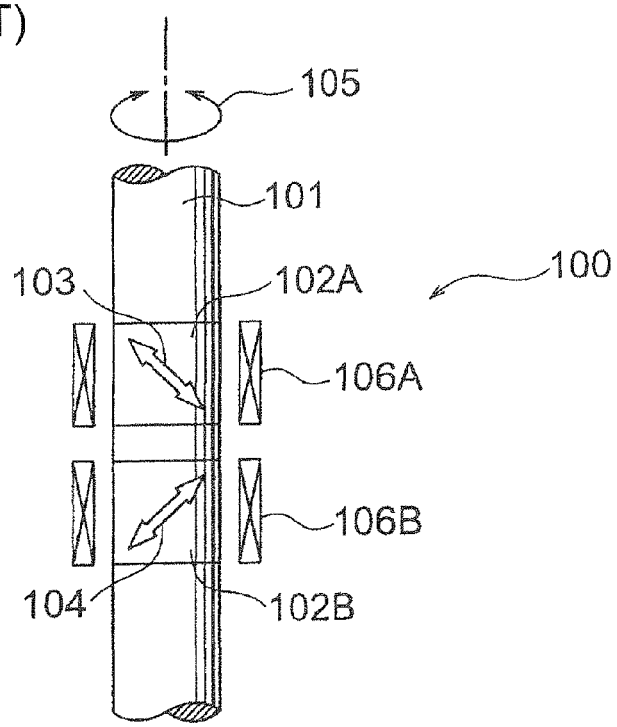
FIG. 11 A side view showing the construction of a main part of a conventional general magnestostrictive torque sensor.
Figure 12:
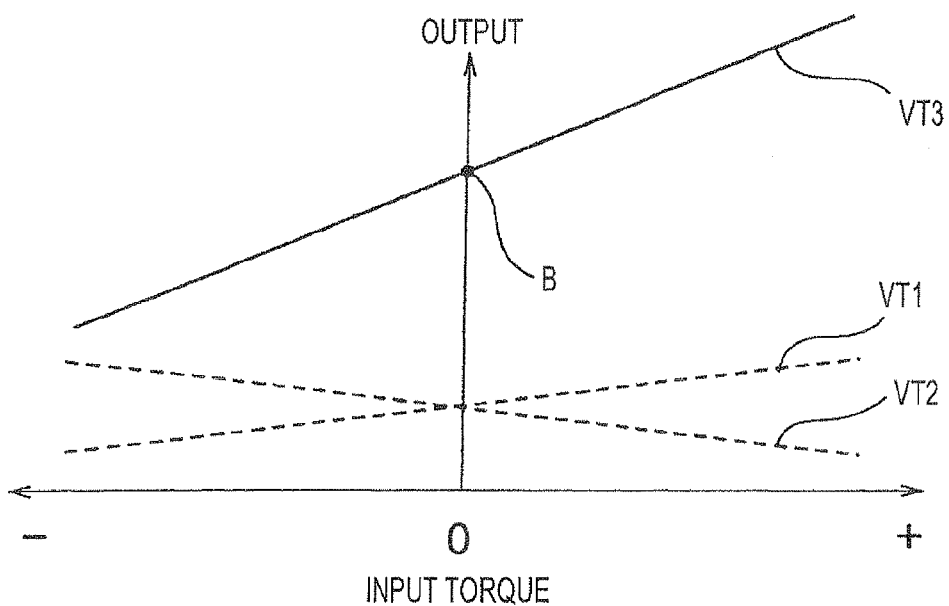
FIG. 12 A graph showing output characteristics of input torque to explain a principle of an input torque detection in a sensor configuration of the magnestostrictive torque sensor.
Figure 13:
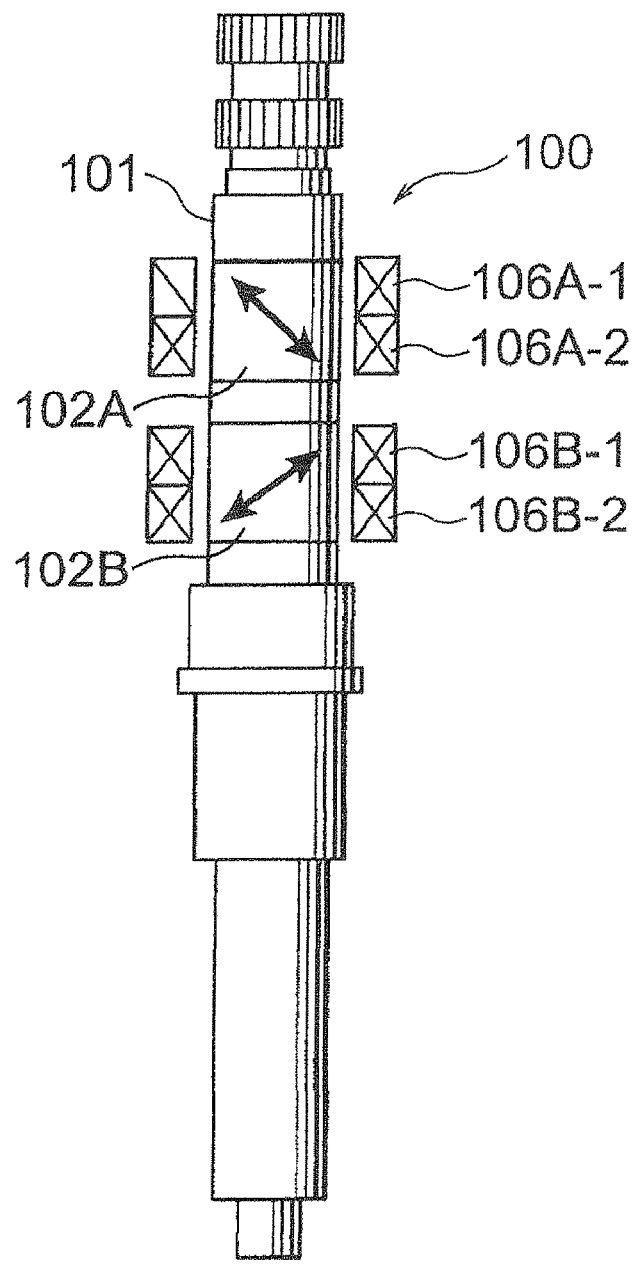
FIG. 13 A side view showing a first example of a conventional magnestostrictive torque sensor to which a failure detecting configuration is added.
Figure 14:
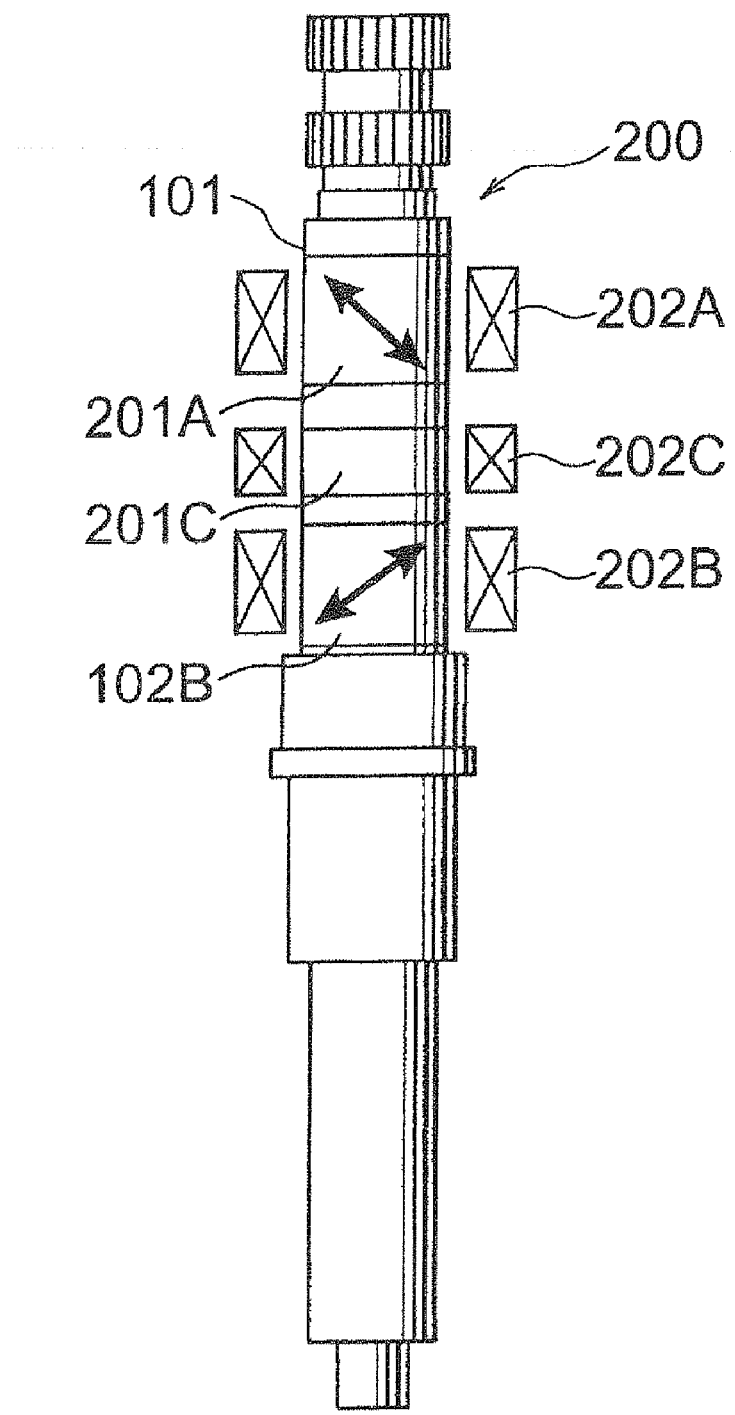
FIG. 14 A side view showing a second example of a conventional magnestostrictive torque sensor to which a failure detecting configuration is added.

FIGS. 10(A) and 10(B) are diagrams which explain advantages of the magnetostrictive film 14 according to the embodiment which is manufactured in the way described above. In this embodiment, as shown in FIG. 10(A), the magnetostrictive film 14 which is formed on the rotating shaft 11 is formed continuously at the one location without being separated, and the torque detecting magnetostrictive film portions 14A, 14B and the failure detecting magnetostrictive film portion 14C are formed on the magnetostrictive film 14. In contrast to this, in the conventional magnestostrictive torque sensor, as shown in FIG. 10(B), for example, two torque detecting upper and lower magnetostrictive films 81, 82 are formed separately on the rotating shaft 11. A separating boundary portion 83 is created between the two magnetostrictive films 81, 82. As a result of this, in the magnetostrictive film 14 according to the embodiment, as shown in FIG. 10(A), since the magnetostrictive film is formed continuously, when a bias magnetic field is applied thereto, the bias magnetic field is made easy to pass through the magnetostrictive film 14 as indicated by reference numeral 84. Because of this, a desirable bias magnetic field can easily be obtained, thereby making it possible to reduce consumed power. In contrast to this, as shown in FIG. 10(B), in the event of the separated magnetostrictive films being formed, a bias magnetic field 85 is discontinued at the separating boundary portion 83. Because of this, in order to obtain a desirable bias magnetic field, a bias magnetic field needs to be generated from the outside by large consumed power. When comparing the magnetostrictive film of the embodiment which is formed continuously at the one location with the conventional separated magnetostrictive films, a change in power relative to bias magnetic field is larger on the single or integral magnetostrictive film than on the separated ones. In generating the same bias magnetic field, according to the actually measured data, with the magnetostrictive film construction of the embodiment, consumed power can be reduced by about 10%.

According to the magnestostrictive torque sensor manufacturing method of the invention, the intermediate magnetostrictive film portion as the non-torque sensitive area can be formed only by heat treating the upper and lower magnetostrictive film portions which have the opposite magnetic anisotropies in such a state that torque is applied thereto in the conventional manner. Thus, the process for preparing the magnetostrictive film can be simplified. In addition, compared with the case in which the magnetostrictive films are formed at two locations, the number of detection coils can be decreased. Compared with a case in which magnetostrictive films are formed at three locations, the composition of Fe does not have to be changed, and therefore, the magnetostrictive film can be manufactured without increasing the number of manufacturing processes.

The electric power steering system according to the invention makes use of the magnetostrictive torque sensor according to the invention at the steering torque detecting portion. Thus, the number of components can be decreased, and the dimension of the portion where the steering shaft resides can be made short. Consequently, the electric power steering can be fabricated compact with the simple construction.

The configurations, shapes, sizes and positional relationships that have been described in the embodiment are only described schematically to such an extent that the invention can be understood and carried out. In addition, the numeric values and the compositions (materials) of the configurations are only described as examples. Consequently, the invention is not limited to the embodiment that has been described and hence can be modified into various forms without departing from the scope of the technical concept shown in claims.

While the invention has been described in detail and by reference to the specific embodiment, it is obvious to those skilled in the art to which the invention relates that the invention can be altered or modified variously without departing from the spirit and scope of the invention.

This patent application is based on Japanese Patent Application (No. 2008-048579) filed on Feb. 28, 2008, the contents of which are to be incorporated herein by reference.

INDUSTRIAL APPLICABILITY

The magnestostrictive torque sensor according to the invention is used at a steering torque detecting portion of an electric power steering system of a vehicle.

The invention claimed is:

1. A magnetostrictive torque sensor comprising:
a rod-shaped rotating shaft;
a magnetostrictive film which is formed on a surface of the rotating shaft so as to extend along a full circumference of the surface in a circumferential direction; and
a first detection coil, a second detection coil and a third detection coil which are disposed along a circumference of the magnetostrictive film,
wherein the magnetostrictive film is formed as an area which extends continuously in an axial direction of the rotating shaft and includes on the continuously formed area a first magnetostrictive film portion and a second magnetostrictive film portion having magnetic anisotropies which are opposite to each other and a third magnetostrictive film portion which is formed between the first magnetostrictive film portion and the second magnetostrictive film portion, and
wherein the first detection coil, the second detection coil and the third detection coil are provided so as to correspond to the first magnetostrictive film portion, the second magnetostrictive film portion and the third magnetostrictive film portion, respectively.

2. The magnestostrictive torque sensor according to claim 1, wherein the third magnetostrictive film portion is a non-torque sensitive area, and the third detection coil is a failure detecting coil.

3. An electric power steering system comprising:
a steering shaft;
a steering torque detecting portion for detecting steering torque applied to the steering shaft; and
a control unit which controls to drive a motor in accordance with a steering torque detection signal which is outputted by the steering torque detecting portion so as to give assisting torque to the steering shaft,
wherein the steering torque detecting portion includes a magnetostrictive torque sensor according to claim 2.

4. The magnestostrictive torque sensor according to claim 1, wherein the magnetostrictive film is formed at a portion in the axial direction of the rotating shaft on a circumferential surface of the rotating shaft so as to extend continuously in the axial direction.

5. An electric power steering system comprising:
a steering shaft;
a steering torque detecting portion for detecting steering torque applied to the steering shaft; and
a control unit which controls to drive a motor in accordance with a steering torque detection signal which is outputted by the steering torque detecting portion so as to give assisting torque to the steering shaft,
wherein the steering torque detecting portion includes a magnetostrictive torque sensor according to claim 4.

6. The manufacturing method for the magnetostrictive torque sensor according to claim 5, wherein the same heating coil is used in the heat treatment applied to the first magnetostrictive film portion and the heat treatment applied to the second magnetostrictive film portion, and respective axial lengths of the first magnetostrictive film portion and the second magnetostrictive film portion are substantially the same.

7. The magnestostrictive torque sensor according to claim 1, wherein axial lengths of the first magnetostrictive film portion, the second magnetostrictive film portion and the third magnetostrictive film portion are substantially the same.

8. An electric power steering system comprising:
a steering shaft;
a steering torque detecting portion for detecting steering torque applied to the steering shaft; and
a control unit which controls to drive a motor in accordance with a steering torque detection signal which is outputted by the steering torque detecting portion so as to give assisting torque to the steering shaft,
wherein the steering torque detecting portion includes a magnetostrictive torque sensor according to claim 7.

9. The magnestostrictive torque sensor according to claim 1, wherein the rotating shaft is at least part of a steering shaft of an electric power steering system of a vehicle.

10. An electric power steering system comprising:
a steering shaft;
a steering torque detecting portion for detecting steering torque applied to the steering shaft; and
a control unit which controls to drive a motor in accordance with a steering torque detection signal which is outputted by the steering torque detecting portion so as to give assisting torque to the steering shaft,
wherein the steering torque detecting portion includes a magnetostrictive torque sensor according to claim 1.

11. A manufacturing method for a magnestostrictive torque sensor comprising:
forming a magnetostrictive film on a surface of a rod-shaped rotating shaft along a full circumference of the surface in a circumferential direction at a portion in an axial direction of the rotating shaft so as to extend continuously in the axial direction;
applying a heat treatment to a first magnetostrictive film portion of the magnetostrictive film with first torsional torque applied to the rotating shaft;
releasing the first torsional torque to provide a first magnetic anisotropy in the first magnetostrictive film portion;

applying a heat treatment to a second magnetostrictive film portion with applying, to the rotating shaft, second torsional torque which acts in an opposite direction to the first torsional torque; and releasing the second torsianl torque to produce a second magnetic anisotropy in the second magnetostrictive film portion, the second magnetic anisotropy being opposite the first magnetic anisotropy, wherein a third magnetostrictive film portion having no magnetic anisotropy is formed between the first magnetostrictive film portion and the second magnetostrictive film portion, and wherein the first magnetostrictive film portion, the second magnetostrictive film portion and the third magnetostrictive film portion on the magnetostrictive film are formed continuously.

12. The manufacturing method for the magnestostrictive torque sensor according to claim 11, wherein the same heating coil is used in the heat treatment applied to the first magnetostrictive film portion and the heat treatment applied to the second magnetostrictive film portion, and respective axial lengths of the first magnetostrictive film portion and the second magnetostrictive film portion are substantially the same.

* * * * *